United States Patent [19]
Reese et al.

[11] Patent Number: 6,063,310
[45] Date of Patent: May 16, 2000

[54] RESIN COMPOSITION OF IMPROVED ELONGATION

[75] Inventors: J. Dale Reese, Midlothian, Va.;
Michael Joseph Gerace, Dayton;
Yasmina Landaburu, Yellow Springs, both of Ohio

[73] Assignee: E. I. du Pont de Nemours and Company, Wilmington, Del.

[21] Appl. No.: 09/179,024

[22] Filed: Oct. 26, 1998

[51] Int. Cl.⁷ .................................................. B01J 13/00
[52] U.S. Cl. ......................... 252/310; 524/425; 524/445; 524/451; 524/492; 524/497; 524/430; 524/449
[58] Field of Search ............................ 252/310; 524/445, 524/425, 451, 492, 493, 494, 497, 449, 430

[56] References Cited

U.S. PATENT DOCUMENTS

| | | | |
|---|---|---|---|
| 2,999,788 | 12/1961 | Morgan | 162/149 |
| 4,330,446 | 5/1982 | Miyosawa | 523/409 |
| 4,460,737 | 7/1984 | Evans et al. | 524/584 |
| 4,514,541 | 4/1985 | Frances | 524/514 |
| 4,921,900 | 5/1990 | Van Trump | 524/744 |
| 5,035,785 | 7/1991 | Debroy et al. | 204/181.7 |
| 5,209,877 | 5/1993 | Frances et al. | 264/9 |
| 5,331,053 | 7/1994 | Atkinson et al. | 525/184 |

*Primary Examiner*—James J. Seidleck
*Assistant Examiner*—U. K. Rajguru

[57] ABSTRACT

The present invention relates to a dispersion of fibrids and the use of this dispersion in resin compositions to increase the elongation of cured films formed from the resin composition.

6 Claims, No Drawings

RESIN COMPOSITION OF IMPROVED ELONGATION

The present invention relates to a resin composition of much improved elongation and the method by which this improved elongation is achieved.

BACKGROUND OF THE INVENTION

Generally aqueous resin compositions such as paints, coatings, sealers, caulks and fillers are modified for improved elongation by adding a plasticizer to the composition or by changing the characteristics of the resin itself, for example lowering the glass transition temperature (Tg) of the resin. Changes such as these may greatly impact the overall performance of the resin composition.

Fibers and fillers have been used in the past to reinforce resin compositions, but reinforcement, while increasing the tensile strength and modulus, causes a reduction in the elongation of the composition.

Examples of teachings of reinforced resin compositions include U.S. Pat. Nos. 4,514,541, which teaches reinforcement of elastomers by incorporation of p-aramid short fiber into the elastomer composition; 5,331,053, which teaches the use of fibrids for reinforcement of elastomers; and 4,460,737, which teaches the use of polyolefine fibers in polyurethane sealers.

The present invention relates to the use of a special organic polymeric material in resin compositions. The polymeric material is a fibrid. A fibrid is not a fiber. A fibrid is an organic particulate that is film-like and has a moderate to relative high surface area. Fibrids are formed by extruding or spinning a solution of the polymer into a non-solvent (for the polymer) coagulation bath while the bath is under vigorous agitation. This non-solvent needs to be miscible with the solvent of the polymer solution.

Fibrids were first introduced in U.S. Pat. No. 2,999,788 to Morgan. Morgan taught methods for making fibrids and a variety of applications. But unlike the present invention Morgan did not teach a fibrid dispersion, that is a combination of fibrids and filler in a water dispersion. Morgan listed the use of fibrids as materials for reinforcing resins and resin compositions, but Morgan did not teach how to use fibrids as a means to increase the elongation of a resin composition.

The present invention provides an aqueous dispersion of fibrids stabilized in water by a combination of an inorganic particulate filler, a coupling agent and a surfactant. This dispersion may then be incorporated into a resin composition to form a mixture. Cured films formed from this mixture show elongations of 2 to 3 times those of cured films formed from the resin composition alone. While at the same time, the strength of cured films formed from this mixture are about equal to those of cured films formed from the resin composition alone.

An object of the present invention is to provide cured films having greater elongation and a more elastic behavior. Another object of the present invention is to provide latitude in formulation resin compositions so that equal elongation may be achieved using stiffer or less costly ingredients.

SUMMARY OF THE INVENTION

The present invention provides an aqueous dispersion formed and stabilized under high shear comprising not more than 0.5% by weight fibrids, not more than 5% by weight of an inorganic particulate filler and a coupling agent and surfactant wherein the coupling agent and the surfactant are present at a concentration sufficient to maintain the fibrids and the inorganic filler in a dispersion.

A second aspect of the present invention is provided when this aqueous dispersion is incorporated into a resin composition. Accordingly, the present invention provides an improved resin composition, containing water or that is compatible with water, containing dispersed resin and additives, the improvement comprising incorporating into the composition an aqueous dispersion comprising not more than 0.5% by weight fibrids, not more than 5% by weight of an inorganic particulate filler with a coupling agent and surfactant wherein the coupling agent and surfactant are each present at a concentration sufficient to maintain the fibrids and the inorganic filler in a dispersion and wherein the concentration of the aqueous dispersion in the resin composition is that which results in the concentration of the fibrids in the resin composition being not more than about 0.25%.

Cured films formed from the improved resin composition show increases elongations of 2 to 3 time that of the cured films formed from the resin composition without the incorporation of the fibrid dispersion.

The resin composition containing the fibrid dispersion of the present invention may be used in making paints, sealers, caulks, filling compounds and the like.

DETAILED DESCRIPTION

As used herein, the term additive means a material other than resin or solvent that is typically used in a resin composition. Additives include pigments, extenders, fillers, thickeners, dispersing aids, for example surfactants, dispersants, coupling agents and chemicals used to buffer pH.

As used herein, the term fibrid means a polymer particle that is film-like. Film-like means that the fibrid has two relatively large dimensions, length and width, and a much smaller dimension of thickness. Generally fibrids have surface areas of about 50 to 300 $m^2/g$. Fibrids have a length, or largest dimension, of from 10 to 1000 microns although the preferable longest dimension is from 10 to 200 microns. The smallest dimensions, thickness, is from about 0.05 to about 0.25 microns. Generally these dimensions are for individual fibrids, but the dimensions may also characterize clumps of fibrids. Fibrids may be formulated form a variety of polymeric material. They are made according to the following U.S. Pat. Nos. 5,209,877; 3,756,908; 3,018,091 or 2,999,788. In general fibrids are formed by spinning (coagulating) a solution of a polymer into a non-solvent for that polymer while the non-solvent coagulation bath is being vigorously agitated. M-aramid fibrids are commercially available from E. I. du Pont Company of Wilmington, Del. (DuPont). DuPont Fibrids are sold never-dried or dry. Either form is acceptable for use in the present invention, but never-dried fibrids are preferred.

Attempts have been made to incorporate fibrids into thin films, but presence of the relatively large fibrids in the film resulted in glosses that were too low or films that were too rough. These earlier experiments simply mixed the fibrids into the resin composition along with other additives and fillers, and required no special formulation or pre-dispersion of the fibrids.

The fibrid dispersion of the present invention may be made in a variety of solvents or mixtures of solvents. The solvent or solvents used in making the dispersion will depend on the solvent and resins of the resin composition into which the fibrid dispersion is the be incorporated. Fibrids, as noted below, are available commercially as dry particles or dispersed in water. Fibrids may also be made, as described below, from various polymers and coagulated in liquids having a wide range of properties so that the fibrids, and any liquid associated with them as a carrier, may be selected to suit a desired use.

The preferred liquid for the fibrid dispersion of the present invention is water. For these preferred fibrid dispersions resin composition as used herein is an aqueous composition or composition that is compatible with the aqueous fibrid dispersion. Compatible means that the resin composition and the fibrid dispersion mix together without the separation into layers or the separation of a component out of the composition or coagulation of the composition. Resin compositions include paints, coatings, sealers compositions, caulks and the like. Generally these are latex compositions having water present at least as a part of the composition solvent system.

The fibrid dispersion of the present invention requires that the fibrids be dispersed under relatively high shear in the presence of an inorganic particulate material, a coupling agent and a surfactant. The fibrid dispersion contains fibrids at a concentration less than 0.5% by weight of the dispersion. The concentration of the inorganic particulate is not more than about 5% by weight. The most preferred concentrations are where the fibrid concentration is at not more than about 0.4% and the inorganic particulate concentration is from about 2 to 4%. In this concentration range the fibrid dispersion is of a water like viscosity.

The coupling agent is a small molecule that aids in the dispersion of a solid particulate material into a liquid medium and are of the following types: silanes, titanates and zirconates. A surfactant is a larger molecule having dissimilar functional parts in the molecule and therefore aiding in the dispersion of a solid particular material into a liquid medium. Surfactants may be anionic, nonionic or cationic. The type and concentrations of surfactants and coupling agents depend on the nature of the particles being dispersed and the nature of the liquid in which the particles are to be dispersed. Coupling agents useful in the present invention include SILQUEST brand products A-1106, A-87 and A-100 manufactured by Witco Corporation; Kr 55, Lica 38 and K Lica 97-WE50, titanates manufactured by Ken-React and NZ-01, NZ-97, zirconates manufactured by Ken-React. The preferred coupling agents are Lica 97-WE50, SILQUEST A-187 and A-1100. For aramid fibrids, SILQUEST A-1100 is most preferred.

Surfactants useful in the present invention include nonionics such as PLURONIC products P-103 and P-105 and ICONOL DA-6-90 manufactured by BASF, Akzo Nobel Chemical's products AROMOX DM-16, and ETHOMID products 0/17 and HT-23, DISPERBYK 181 manufactured by Byk Chemie, FC-430 manufactured by 3M, TRITON products X-14 and X-705 manufactured by Union Carbide and SURFYNOL CT-111manufactured by Air Products; anionics such as Byk Chemie products DISPERBYK-110 and BYK products 156 and 151, FC-129 manufactured by 3M and SURFYNOL CT 131 manufactured by Air Products and cationics such as Byk Chemie products DISPERBYK 130 and 182 and FC-135 manufactured by 3M. The preferred surfactants for the present invention are FC-430, DISPERBYK 181 and AROMOX DM-16 with AROMOX DM-16 being most preferred.

The concentration of coupling agents and surfactants is usually low compared to other components of the resin composition, but it is necessary to use an amount of each that is sufficient to stabilize the fibrid dispersion. One can experimentally determine the amount of each of these components to use in the fibrid dispersion or in the overall resin composition by making a dispersion at given concentrations of the coupling agent and the surfactant and checking the degree of grind using ASTM test 1210. In this test the dispersion or composition is drawn down on a grind or Hegman Gauge to determine a what film thickness particles protrude above the surface of the film. The concentration of the coupling agent and/or surfactant can the be adjusted to produce the thinnest film possible with a smooth dispersion that does not show evidence of particles.

The inorganic particulates used in the present invention may be materials known as fillers, pigments or extenders. These materials include clays, calcium carbonates, talcs, silicas, titanium dioxides, micas, silicates, glass, oxides and the like. These particulates may be chosen form the inorganic material that is already a part of the resin composition and should be chosen to be compatible with the resin composition as well as to meet the desired performance criteria for the composition. For example, inorganic particulate material are available in a variety of particle sizes and having a variety of surface treatments. All that is necessary is that the inorganic material provide a harder surface than the fibrid clumps they are intended to aid to disperse, and that these particles are of an appropriate particle size and thixotropic property that they can be included in the final formulation of the improved resin composition that the resin composition have the desired properties. If, for example a particular clay is part of the initial resin composition, one might consider using it in the fibrid dispersion so long as at the concentration of less than 5% by weight in the fibrid dispersion this clay dispersed and stabilized the fibrids. As with selection and concentration of the coupling agents and surfactants, one can use a grind gauge to aid in the selection of an inorganic particulate to use in the present invention. Inorganic particulates particularly preferred are abrasive filler clays such as MINUGEL manufactured by Floridin because of their relatively lower cost. If desired, pigments may also be used that are compatible with the final resin composition formulation and color desired.

To achieve the fibrid dispersion of the present invention, the components need to be mixed together under high shear. Methods of dispersion known in the art of paint making that provide high shear may be used to form the fibrid dispersion of the present invention. For example, Cowles blade disperser at about 5000 to 10,000 rpm or an emulsifier provide adequate shear to disperse the fibrids. The time required may be from about 30 minutes to about 90 minutes. Heat decreases the time required to make the dispersion. Heat may be provided by an external source, but normally the shear rate is sufficient to heat the mixture. Cooling is usually needed to control the temperature at some fixed value. Preferably the fibrid dispersion is made in an emulsifier at about 230° F. for a time of about an hour. Again the grind gauge may be used to check the fibrid dispersion and determine the grind conditions (temperature, time, shear rate) for the dispersion. These conditions can be expected to vary depending on the choice of inorganic particulate, surfactant, coupling agent used to make the fibrid dispersion. The order of addition of the components to the grind vessel is not critical.

Once the fibrid dispersion is made it may be incorporated into a resin composition at low shear, for example by mixing in by stirring.

The concentration of the fibrid dispersion that is preferred is that which will result in a total fibrid concentration in the mixture of the resin composition and the dispersion of about 0.15% by weight. At this concentration of total fibrid content the resin mixture viscosity is not increased due to the fibrids present, but it may be increased by the presence of the inorganic particulate that is present in the fibrid dispersion. In practice it is recommended that the thickeners or possibly the content of other viscosity increasing components of the resin composition be reduced so that the addition of the inorganic particulate is accommodated and does not unduly alter properties of the improved resin composition. Modification of the resin composition formulation will vary depending on the properties desired and the end use application of the composition. But the addition of the fibrids by way of the fibrid dispersion of the present invention may be made so that overall properties show little variation compared to a control (that is the resin composition without any addition of the fibrid dispersion). More importantly the addition of the fibrid dispersion may allow flexibility in the formulation of resin compositions. For example, with an increase in the elongation of the mixture, one could use resins of greater stiffness, less plasticizer and higher Tg. With the addition of the inorganic particulate that is a part of the fibrid dispersion, one may be able to reduce the amount of cellulose or other thickeners in the formulation. By removing or decreasing the cellulose content of a formulation, the sensitivity of that formulation to water may be increased. This feature of the present invention may be of particular value in resin compositions used in exterior applications, for example, sealers, caulks, filling compounds, or exterior paints, coatings and finishes.

The present invention provides an aqueous dispersion of fibrid which can be used to improve the elongation of resin compositions or compounds. Such compounds include paints, sealers, caulks filling compounds and adhesives. The composition are improved by the incorporation of the fibrid dispersion into the composition. The preferred amount of the fibrid dispersion to incorporate into such resin compositions is that which will result in the weight percent of the fibrids in the composition being less than about 0.25% with 0.15 being most preferred.

TEST METHODS

Viscosity was measured using a Brookfield Viscometer. Measurements were made at 72° F. and after a 1 minute hand stir of the sample.

Anti-sag was measured using ASTM D 4400; leveling by ASTM D 4062; and adhesion by ASTMD 3359.

Texture and gloss were observed visually using a scale from 0 to 10. For texture a report of 0 indicated a smooth surface, while a reading of 10 indicated a very rough surface. For gloss, a report of 0 indicated no gloss was observed while a reading of 10 indicated that the film showed some shine.

Tensile and elongation were measured on the cured, dry, free film using an Instron Model 1000 at a speed of 5 inches per minute. The free films were prepared by making a 10 mil drawdown on an E-coated metal panel that had been treated with a release agent to make removing the film easy. The film was cured for 24 hours at 120° F. and then removed from the panel and cut into strips of the required shape for testing. Tensile strength and elongation were measured on the same cut strip.

EXAMPLES

The following Example is intended to illustrate the present invention, but is not intended to be limiting.

Example 1

This Example illustrates the making of the fibrid dispersion of the present invention and the use of this dispersion in an exterior acrylic paint formulation.

The dispersion was made using a Ross Mixer emulsifier Model ME-100LC having a fine screen head.

The following material was put into a quart can: 466.2 grams of distilled water; 7.5 grams of A-1100 Silane: 28.2 grams of DuPont fibrids F-20 W (92% moisture) (never-dried) and 25.5 grams of MINUGEL PC clay. This mixture was mixed for 30 minutes at 7000 rpm. The Ross Mixer was stopped and 7.5 grams of Colloid 643 and 7.5 grams of AROMOX were added to the mixture. The Ross Mixer was started again and the run for another 2 hours at 7000 rpm. Water was then added to replace water that evaporated during the mixing operation. The fibrids were well dispersed. This dispersion represents a dispersion of the present invention.

This dispersion was then used to prepare the following paint.

In a quart can the following were added to form the grind mixture: 60 grams of the fibrid dispersion described above; 15.6 grams of propylene glycol; 2.12 grams of TAMOL 731A; 0.56 grams of KTTP; 0.68 grams of TRITON N-57; 0.68 grams of TERGITOL NP-9; 69.64 grams of titanium dioxide; 26.0 grams of OPTIWHITE, clay and 26.0 grams of SNOWFLAKE, clay. This mixture was mixed using the Ross Mixer for 5 minutes at the highest mixer speed. The Ross Mixer was then stopped and another 84.64 grams of the fibrid dispersion was added. The Ross Mixer was restarted and run for 15 minutes at the highest mixer speed. The resulting mixture was let down with following ingredients (the let down): 102.8 gams of ROVACE 9100, acrylic resin, 4.6 grams of DOWNOL DPnB, 6.6 grams of ACRYSOL RM825 and 0.08 g of 28% by weight ammonia. The new mixture was mixed at 3000 rpm for 10 minutes to complete the making of the paint.

This paint was tested and reported in Table 2. The control paints were mixed in the same fashion, but using only the ingredients listed in Table 1.

Table 1 shows the formulation of a control paint, that is the paint without fibrids, Sample A, the control with the addition of 0.15% fibrids directly into the paint grind, and Sample B, the control with the addition of 0.15% fibrids from the fibrid dispersion of the present invention. In Sample A, the fibrids were added in the grind directly to the mix of ingredients. There was no fibrid dispersion used in Sample A.

TABLE 1

|  | Control | SAMPLE A | SAMPLE B |
| --- | --- | --- | --- |
| Fibrids | — | Yes | Yes |
| Fibrid Dispersion | — | — | Yes |
| Ingredients, by weight |  |  |  |
| F 20 W | 0 | 0.15 | 0.15 |
| TAMOL 731 A | 0.55 | 0.55 | 0.55 |
| KTTP | 0.09 | 0.09 | 0.09 |
| SURFYNOL DF | 0.56 | — | — |
| TERGITOL NP-9 | 0.18 | 0.18 | 0.18 |
| TRITON N-57 | 0.18 | 0.18 | 0.18 |
| TI-PURE | 18.20 | 18.20 | 18.20 |
| OPTIWHITE | 6.80 | 6.80 | 6.80 |
| SNOWFLAKE | 6.80 | 6.80 | 6.80 |
| ROVACE 9100 | 26.80 | 26.80 | 26.80 |

TABLE 1-continued

|  | Control | SAMPLE A | SAMPLE B |
|---|---|---|---|
| DOWANOL DPnB | 1.20 | 1.20 | 1.20 |
| ACRYSOL RM-825 | 1.73 | 1.73 | 1.73 |
| Water | 32.81 | 32.81 | 32.81 |
| Propylene Glycol | 4.10 | 4.10 | 4.10 |
| COLLOID 643 | — | 0.5 | 0.5 |
| A-1100 | — | 0.5 | 0.5 |
| AROMAX DM-16 | — | 0.5 | 0.5 |
| MINUGEL PC | — | 1.7 | 1.7 |

Table 2 shows the results of testing these formulations.

TABLE 2

Testing of improved formulation vs. Controls

| Physical Properties | Control | Sample A | Sample B |
|---|---|---|---|
| Appearance | White milky emulsion | White milky emulsion | White milky emulsion |
| Texture | 5 | 5 | 0.5 |
| Gloss | 0 | 0 | 0 |
| Dispersability | 6 (m) | 5 (m) | 3 (s) |
| Viscosity (cps) | 2800 cps | 8300 cps | 2300 cps |
| Anti sag Index | 275 | 300 | 225 |
| Ratio Visc. Antisag index | 10.0 | 27.6 | 10.2 |
| Leveling | 0 | 0 | 4 |
| Tensile (PSI) | 448 PSI | 564 PSI | 483 PSI |
| % Elongation | 58% | 63% | 200% |
| Adhesion (0 - - - 5) Best Worst | 5 | 2 | 3.5 |

What is claimed is:

1. An aqueous fibrid and inorganic particulate dispersion comprising not more than 0.5% by weight fibrids, not more than 5% by weight of an inorganic particulate filler and a coupling agent and surfactant wherein the coupling agent and the surfactant are present at a concentration sufficient to maintain the fibrids and the inorganic filler in dispersion.

2. The dispersion of claim 1 wherein the concentration of fibrids is not more than about 0.4% and the concentration of the inorganic particulate filler is from 2 to 4%.

3. The dispersion of claim 1 wherein the coupling agent is selected from the group consisting of silanes, titanates and zirconates.

4. The dispersion of claim 1 wherein the surfactant is nonionic or anionic.

5. The dispersion of claim 1 wherein the filler is selected from the group consisting of clays, calcium carbonates, talcs, silicas, titanium dioxides, micas, silicates, glass, oxides.

6. An improved resin composition, containing water or that is compatible with water, containing dispersed resin and additives, the improvement comprising incorporating into the composition an aqueous fibrid and inorganic particulate dispersion comprising not more than 0.5% by weight fibrids, not more than 5% by weight of an inorganic particulate filler with a coupling agent and surfactant wherein the coupling agent and the surfactant are each present at a concentration sufficient to maintain the fibrids and the inorganic filler in dispersion and wherein the concentration of the aqueous fibrid and inorganic particulate dispersion in the resin composition is that which results in the concentration of the fibrids in the resin composition being not more than 0.25%.

* * * * *